(12) United States Patent
    Kuroda

(10) Patent No.:  US 11,165,296 B2
(45) Date of Patent:  Nov. 2, 2021

(54) MOTOR

(71) Applicant: MINEBEA MITSUMI Inc., Nagano (JP)

(72) Inventor: Minoru Kuroda, Sakaiminato (JP)

(73) Assignee: MINEBEA MITSUMI INC., Nagano (JP)

( * ) Notice: Subject to any disclaimer, the term of this patent is extended or adjusted under 35 U.S.C. 154(b) by 69 days.

(21) Appl. No.: 16/292,759

(22) Filed: Mar. 5, 2019

(65) Prior Publication Data

US 2019/0280541 A1    Sep. 12, 2019

(30) Foreign Application Priority Data

Mar. 7, 2018  (JP) .............................. JP2018-041062

(51) Int. Cl.
| | | |
|---|---|---|
| *H02K 1/28* | (2006.01) | |
| *H02K 1/17* | (2006.01) | |
| *H02K 5/15* | (2006.01) | |
| *H02K 23/04* | (2006.01) | |

(52) U.S. Cl.
    CPC ................ *H02K 1/28* (2013.01); *H02K 1/17* (2013.01); *H02K 5/15* (2013.01); *H02K 23/04* (2013.01); *H02K 2213/03* (2013.01)

(58) Field of Classification Search
    CPC .. H02K 1/00; H02K 1/06; H02K 1/12; H02K 1/17; H02K 1/18; H02K 1/185; H02K 1/24; H02K 1/26; H02K 1/265; H02K 1/28; H02K 23/00; H02K 23/02; H02K 23/04; H02K 23/32; H02K 15/00; H02K 15/03; H02K 5/00; H02K 5/04; H02K 5/15
    See application file for complete search history.

(56) References Cited

U.S. PATENT DOCUMENTS

| | | | | |
|---|---|---|---|---|
| 3,889,141 | A * | 6/1975 | Merriam .................. | H02K 1/17 310/154.24 |
| 4,372,035 | A * | 2/1983 | McMillen ................ | H02K 1/17 29/596 |
| 5,315,191 | A * | 5/1994 | Suzuki ..................... | H02K 1/02 310/154.21 |
| 5,473,210 | A * | 12/1995 | Someya ................... | H02K 1/17 29/607 |
| 6,700,269 | B2 * | 3/2004 | Torii ....................... | H02K 15/14 310/152 |

(Continued)

FOREIGN PATENT DOCUMENTS

JP    2003-250255 A    9/2003

*Primary Examiner* — Tran N Nguyen
(74) *Attorney, Agent, or Firm* — Pearne & Gordon LLP

(57) ABSTRACT

A motor includes a rotary shaft, an armature part, a frame including a tubular portion surrounding the armature part, and a plurality of magnets. The tubular portion is formed of a magnetic body. The tubular portion includes a plurality of flat parts and a plurality of curved parts. Each of the plurality of flat parts and each of the plurality of curved parts being alternately arranged in a peripheral direction. On an inner surface of the tubular portion in each of the plurality of curved parts, a plurality of magnetic poles are provided. A magnetic gap is provided in a radial direction, the magnetic gap being formed by the inner surface of the tubular portion in each of the plurality of flat parts and the armature part.

4 Claims, 12 Drawing Sheets

(56) References Cited

U.S. PATENT DOCUMENTS

| | | | |
|---|---|---|---|
| 7,986,065 B2 * | 7/2011 | Bhatti | H02K 5/15 |
| | | | 310/89 |
| 2002/0084714 A1 * | 7/2002 | Fujita | H02K 23/04 |
| | | | 310/181 |
| 2007/0007838 A1 * | 1/2007 | Kuroda | H02K 23/04 |
| | | | 310/154.21 |
| 2015/0130329 A1 * | 5/2015 | Kawashima | H02K 23/04 |
| | | | 310/68 C |
| 2015/0236552 A1 * | 8/2015 | Lauk | H02K 1/17 |
| | | | 310/154.29 |

* cited by examiner

MOTOR

CROSS REFERENCE TO RELATED APPLICATIONS

This application claims the benefit of Japanese Patent Application No. 2018-041062, filed on Mar. 7, 2018, which is hereby incorporated by reference in its entirety.

BACKGROUND

Technical Field

The present disclosure relates to a motor.

Background

Conventionally, a motor, for example, a motor being of an oval shape (elliptical shape) or the like, having a plurality of magnets separated from each other in a peripheral direction has been used. In the motor, one part of intervals between the magnets in the peripheral direction is made comparatively wide.

Note that in Japanese Patent Application Laid-Open No. 2003-250255, one example of a configuration of a motor having two magnets is described.

The present disclosure is related to providing a motor being operable to output a comparatively large torque.

SUMMARY

In accordance with one aspect of the present disclosure, a motor includes: a rotary shaft; an armature part; a frame including a tubular portion surrounding the armature part; and a plurality of magnets, the tubular portion is formed with a magnetic body, the tubular portion includes a plurality of first areas and a plurality of second areas, each of the first areas and each of the second areas being alternately arranged in a peripheral direction, at an inner surface of the tubular portion in each of the plurality of second areas, a plurality of magnetic poles are provided, and a magnetic gap is provided in a radial direction, the magnetic gap being formed by an inner surface of the tubular portion in each of the plurality of first areas and the armature part.

Preferably, in the peripheral direction, polarities of two magnetic poles neighboring the tubular portion in each of the first areas are same as each other.

Preferably, a part of the tubular portion in each of the plurality of first areas is a flat plate part, and a part of the tubular portion in each of the plurality of second areas is a curved part.

Preferably, each of the plurality of magnets includes two magnetic poles arranged in the peripheral direction, and in each of the plurality of curved parts, a range having two magnetic polarities imparted by the two magnetic poles is in a range of substantially 120 degrees with the rotary shaft as a center.

Preferably, a projecting portion projecting toward the armature part is provided at the inner surface of the tubular portion in each of the first areas.

Preferably, the projecting portion has a curved surface.

Preferably, the projecting portion has a magnetic pole.

In accordance with these aspects of the present disclosure, a motor being operable to output a comparatively large torque can be provided.

DETAILED DESCRIPTION

Hereinafter, an embodiment of the present disclosure will be described with reference to the accompanying drawings.

Note that in the present application, a direction along a rotary shaft of a motor may be referred to as an "axis direction", a direction orthogonal to the rotary shaft of the motor may be referred to as a "radial direction", and a direction along a circular arc with the rotary shaft of the motor as a center may be referred to as a "peripheral direction", respectively. In addition, in the present application, the axis direction may be referred to as a front-rear direction (with a left side in FIG. 1 being a front), a direction, among radial directions, perpendicular to each flat plate part may be referred to as an upper-lower direction (with an upper side in FIG. 2 being an upper), and a direction, among the radial directions, in parallel with the each flat plate part may be referred to as a right-left direction (with a right side in FIG. 2 being a left) when shapes of respective parts and positional relationships are described. However, these front-rear, upper-lower, and right-left directions are defined merely to facilitate the description and do not limit directions of an apparatus with the motor according to the present disclosure mounted and postures of this motor when used at all.

Embodiments

Figure 1:
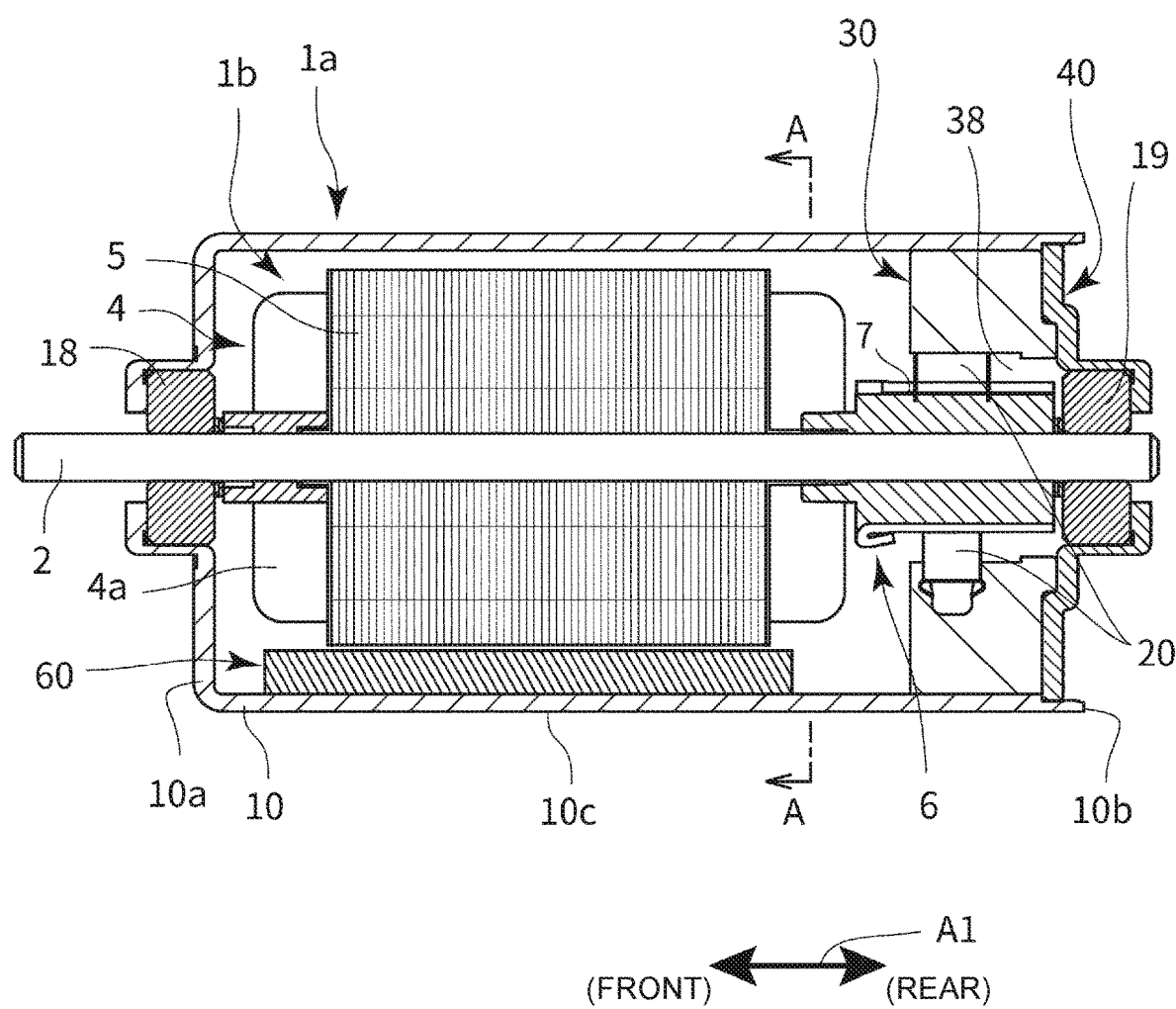
FIG. 1 is a cross-sectional view showing a motor in one embodiment of the present disclosure.

FIG. 1 is a cross-sectional view showing a motor 1 in one embodiment of the present disclosure.

A cross-section shown in FIG. 1 is a cross-section taken from a line B-B in FIG. 2 later described. In the below Figs., each arrow A1 indicates a rotary shaft direction.

The motor 1 is, for example, a DC motor. The motor 1 includes a frame assembly 1a, an armature part 1b being rotatable with respect to the frame assembly 1a, and a rotary shaft (shaft) 2.

The armature part 1b includes an armature main body 4, a commutator part 6, and the like. The armature main body 4 is attached to the rotary shaft 2. The armature main body 4 includes an armature core 5 having a plurality of salient-poles projecting in radial directions, windings 4a wound onto the salient-poles, and the like. The commutator part 6 is arranged in the vicinity of one end portion of the rotary shaft 2. The commutator part 6 includes a commutator 7 contacting a brush 20 arranged in the frame assembly 1a, and the like.

Although in the present embodiment, a number of slots of the armature part 1b is nine, the number of slots is not limited to nine and may be, for example, 15.

The frame assembly 1a includes a frame (motor case) 10 having a tubular portion 10c, a bracket 30, a plate 40, a plurality of magnets 60, and the like.

The frame 10 includes the tubular portion 10c, an end portion 10a (one end portion) on a front side, and an end portion 10b (another end portion) on a rear side. The tubular portion 10c has a cylindrical shape with the end portion 10a on the front side covered with a surface. In other words, in the frame 10, the tubular portion 10c has a cup-like shape with the end portion 10b on the rear side serving as an opening part. The opening part of the end portion 10b on the rear side of the frame 10 (the end portion on the right side in FIG. 1) is covered with the plate 40. Inside a housing constituted of the frame 10 and the plate 40, the armature part 1b is housed.

On an inner side of the plate 40, the bracket 30 is attached. The bracket 30 holds a terminal part (not shown), and electric current is supplied to the terminal part from the outside. The terminal part is electrically connected with the brush 20. The brush 20 is located so as to contact the commutator 7.

The bracket 30 is formed with, for example, a resin member. The bracket 30 has a thickness in the rotary shaft direction. The bracket 30 includes a tubular portion having an opening 38, and the rotary shaft 2 passes through the opening 38. In the present embodiment, the bracket 30 is a tubular portion having the opening 38 in the central portion. The rear side of the bracket 30 is covered with the plate 40. In the opening 38, the brush 20 is arranged. In addition, the rotary shaft 2 penetrates through the opening 38.

The rotary shaft 2 penetrates through a surface of the frame 10 on the front side. In other words, a front end portion of the rotary shaft 2 projects outside the frame 10 from the frame 10. The other portion of the rotary shaft 2 is housed inside the frame 10. In a central portion of the surface of the frame 10 on the front side, a bearing 18 is held. In addition, in a central portion of the plate 40, a bearing 19 is held. The rotary shaft 2 is supported rotatably with respect to the frame 10 by the two bearings 18 and 19.

The magnets 60 are arranged on an inner side of the frame 10 and are attached onto an inner surface of the tubular portion 10c. An outer peripheral surface of the tubular portion 10c of the frame 10 becomes an outer peripheral surface of the motor 1. The frame 10 is a magnetic body surrounding the armature part 1b in a peripheral direction.

The magnets 60 are bond magnets formed by using, for example, the heretofore known rare earth material and the heretofore known resin material. Note that the magnets 60 are not limited to the bond magnets and may be, for example, sintered type magnets.

Figure 2:
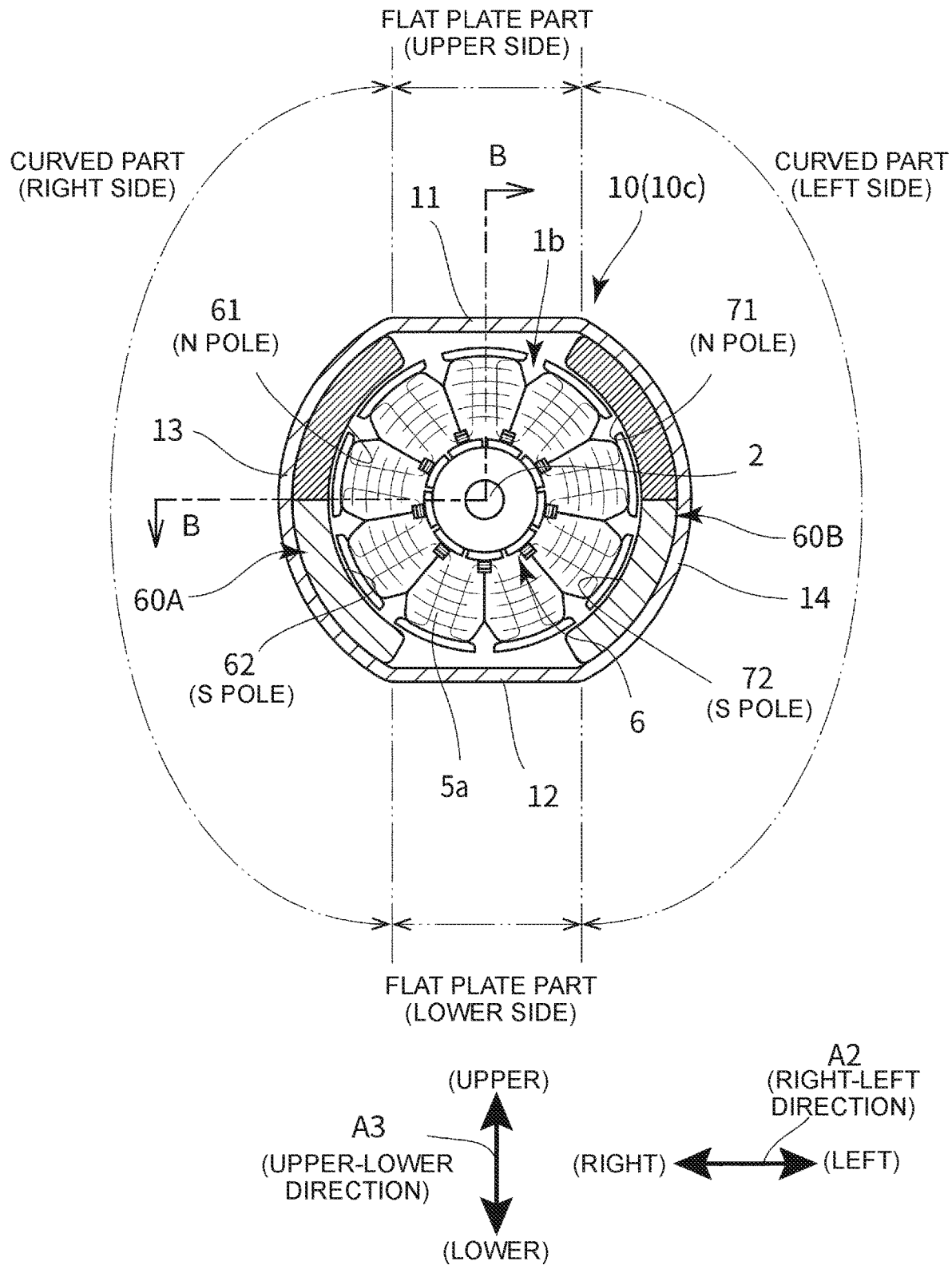
FIG. 2 is a cross-sectional view taken from a line A-A in FIG. 1.

FIG. 2 is a cross-sectional view taken from a line A-A in FIG. 1.

In FIG. 2, a cross-section of the frame assembly 1a is shown and a view of the armature part 1b viewed from a rear side is shown.

In the frame 10, each of a plurality of first areas and each of a plurality of second areas are alternately arranged in the peripheral direction. Each of the second areas is an area with at least one or more among the plurality of magnets 60 provided on an inner side of each of the second areas. The later-described magnetic gap formed by the inner surface of the tubular portion 10c in each of the first areas and the armature part 1b is provided, and each of the first areas is an area with no magnet 60 provided on an inner side of each of the first areas. Providing the magnets 60 in the respective second areas provides a plurality of magnetic poles arranged in the peripheral direction.

In other words, in the present embodiment, as shown in FIG. 2, the motor 1 is provided with the two magnets 60 (a first magnet 60A and a second magnet 60B).

The frame 10 includes two flat plate parts (one example of the first areas) 11 and 12 and two curved parts (one example of the second areas) 13 and 14, each of the two flat plate parts and each of the two curved part being alternately arranged in the peripheral direction. In other words, the frame 10 is of an oval shape (elliptical shape) in an outer peripheral shape having the two flat plate parts 11 and 12 and the two curved parts 13 and 14 connecting the flat plate parts 11 and 12 with each other. The motor 1 has the so-called oval shape (elliptical shape). The motor 1 has an outer peripheral shape with a dimension in an upper-lower direction (indicated by an arrow A3) smaller than a dimension in a right-left direction (indicated by an arrow A2). The frame 10 has a substantially uniform thickness. An inner peripheral surface of the frame 10 is configured by connecting a plurality of flat portions constituted of the flat plate parts 11 and 12 and a plurality of round portions constituted of the curved parts 13 and 14.

An outer peripheral part of the frame 10 is configured by, starting the connection from the upper side flat plate part 11, connecting the upper side flat plate part 11, the left side curved part 14, the lower side flat plate part 12, and the right side curved part 13 clockwise in FIG. 2 and again connecting the right side curved part 13 to the upper side flat plate part 11. The upper side flat plate part 11 is located on an upper side of the motor 1 and the lower side flat plate part 12 is located on a lower side of the motor 1. Each of the flat plate parts 11 and 12 is of a tabular shape substantially perpendicular to the upper-lower direction. The right side curved part 13 is located on a right side of the motor 1 and the left side curved part 14 is located on a left side of the motor 1. Each of the right side curved part 13 and the left side curved part 14 has an outwardly convex round shape. An outer peripheral shape of the motor 1 is substantially point-symmetrical with the rotary shaft 2 as a point of symmetry in a cross-section perpendicular to the rotary shaft 2.

On an inner side of the right side curved part 13, the first magnet 60A is arranged. In addition, on an inner side of the left side curved part 14, the second magnet 60B is arranged. Each of the magnets 60 has an outer peripheral surface being of a round shape along an inner peripheral surface of each of the curved parts 13 and 14 of the frame 10. In addition, each of the magnets 60 has an inner peripheral surface being of a columnar surface shape. Between the inner peripheral surfaces of the magnets 60 and the armature core 5, a slight magnetic gap is provided. This magnetic gap is formed with the inner peripheral surfaces of the magnets 60 and the armature core 5. In an illustrated example, the magnetic gap is an air gap.

In the present embodiment, the magnets 60 are attached on the inner peripheral surface of the frame 10. The magnets 60 are housed on the inner side of the frame 10 from an opening part on the rear side of the frame 10, are pressed to inner surfaces of the curved parts 13 and 14 by, for example, a spring located between the two magnets 60, and are thus fixed. Subsequently, by housing the armature part 1b inside the frame 10 and attaching the bracket 30 and the plate 40 to the frame 10, the motor 1 is assembled.

The first magnet 60A has two magnetic poles 61 and 62 (an N pole 61 and an S pole 62) arranged one above the other. In addition, the second magnet 60B has two magnetic poles 71 and 72 (an N pole 71 and an S pole 72) arranged one above the other. In other words, the first magnet 60A has the N pole 61 and the S pole 62 arranged in the peripheral direction (counterclockwise in FIG. 2). In addition, the second magnet 60B has the N pole 71 and the S pole 72 arranged in the peripheral direction (clockwise in FIG. 2). Note that each of the first magnet 60A and the second magnet 60B is the so-called radial direction anisotropic magnet. In the above description, polarity shown for each of the magnetic poles 61 and 62 as well as 71 and 72 is polarity of an inner surface side (armature part 1b side) of each of the magnets 60A and 60B, and this is similar in the below description.

The motor 1 has the magnetic poles 61 and 62 as well as 71 and 72, and the number of the magnetic poles 61 and 62 as well as 71 and 72 is double the number of the curved parts 13 and 14 of the motor 1. The four magnetic poles 61 and 62 as well as 71 and 72 are located in the two curved parts 13 and 14 of the frame 10 such that the magnetic poles 61 and 62 as well as 71 and 72 face each other, respectively.

In the present embodiment, polarities of the two magnetic poles 61 and 71 arranged to neighbor to the upper side flat plate part 11 on both sides of the upper side flat plate part 11 in the peripheral direction are the same as each other. In other words, the magnetic pole 71 arranged in a position neighboring clockwise to the upper side flat plate part 11 is an N pole and the magnetic pole 61 arranged in a position neighboring counterclockwise to the upper side flat plate part 11 is also the N pole. In other words, the motor 1 has a configuration provided with the two N poles 61 and 71 having the polarities being the same as each other and in the configuration, the upper side flat plate part 11 having no magnet is arranged between the two N poles 61 and 71.

In addition, polarities of the two magnetic poles 62 and 72 arranged to neighbor to the lower side flat plate part 12 on both sides of the lower side flat plate part 12 in the peripheral direction are the same as each other. In other words, the magnetic poles 62 arranged in a position neighboring clockwise to the lower side flat plate part 12 is an S pole and the magnetic pole 72 arranged in a position neighboring counterclockwise to the lower side flat plate part 12 is also the S pole. In other words, the motor 1 has a configuration provided with the two S poles 62 and 72 having the polarities being the same as each other, and in the configuration, the lower side flat plate part 12 having no magnet is arranged between the two S poles 62 and 72.

Positional relationship of the polarities of the magnetic poles 61 and 62 as well as 71 and 72 as described above is as follows. In other words, the polarities of the magnetic poles 61 and 62 of the first magnet 60A and the polarities of the magnetic poles 71 and 72 of the second magnet 60B are bilaterally symmetrical with respect to a plane passing through the rotary shaft 2 and being substantially perpendicular to the flat plate parts 11 and 12.

Figure 3:
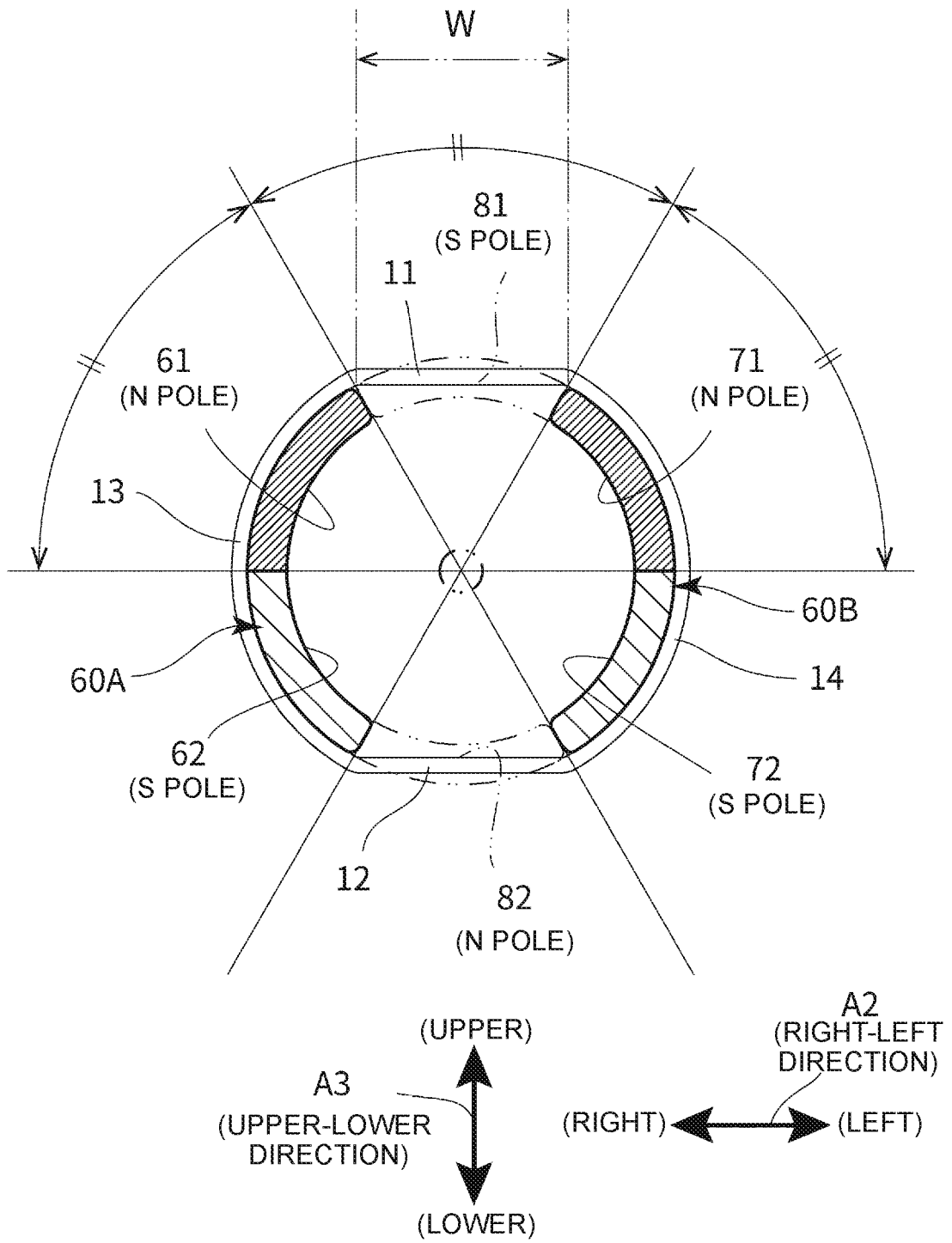
FIG. 3 is a diagram illustrating positional relationship between respective parts of a frame of the motor and magnetic poles.

FIG. 3 is a diagram illustrating the positional relationship between respective parts of the frame 10 of the motor 1 and the magnetic poles 61 and 62 as well as 71 and 72.

In FIG. 3, the illustration of the armature part 1b is omitted.

As shown in FIG. 3, in the present embodiment, although the number of the magnetic poles 61 and 62 as well as 71 and 72 provided for the magnets 60 is four, the motor 1 is arranged to be driven as the whole of the motor 1 has 6 poles. In other words, it can be said that the motor 1 is a 6-pole 9-slot motor.

In other words, by arranging the magnetic pole 61 and magnetic pole 71 being the N poles on the both sides of the upper side flat plate part 11 in the peripheral direction, a lateral central portion of the upper side flat plate part 11 is magnetized and thus becomes a magnetic pole 81. The magnetic pole 81 is the S pole.

In addition, by arranging the magnetic pole 62 and the magnetic pole 72 being the S poles on the both sides of the lower side flat plate part 12 in the peripheral direction, a lateral central portion of the lower side flat plate part 12 is magnetized and thus becomes a magnetic pole 82. The magnetic pole 82 is the N pole.

Thus, a periphery of the 9-slot armature part 1b is surrounded clockwise by the magnetic pole 71, the magnetic pole 72, the magnetic pole 82, the magnetic pole 62, the magnetic pole 61, and the magnetic pole 81. The polarities of the magnetic poles 61 and 62 as well as 71 and 72, 81, and 82 are as described above, and the N pole and the S pole are alternately arranged in the peripheral direction, respectively. Accordingly, it can be said that with the magnetic poles 81 and 82 combined, the motor 1 is the 6-pole 9-slot motor as a whole.

Here, as shown in FIG. 3, in the right side curved part 13, a range having the two magnetic polarities (the N pole and the S pole) imparted by the two magnetic poles 61 and 62 is in a range of substantially 120 degrees with the rotary shaft 2 as a center. Also in the left side curved part 14, similarly, a range having the two magnetic polarities imparted by the two magnetic poles 71 and 72 is in a range of substantially 120 degrees with the rotary shaft 2 as the center. In other words, in each of the upper side flat plate part 11 and lower side flat plate part 12 having no magnets 60, a range having the polarity is in a range of substantially 60 degrees with the rotary shaft 2 as the center. In the present embodiment, a length W of each of the upper side flat plate part 11 and the lower side flat plate part 12 in the right-left direction is substantially equal to a radius of each of the curved parts 13 and 14. A range having each of the magnetic polarities imparted by each of the magnetic poles 61 and 62 as well as 71 and 72, 81, and 82 is a mutually substantially equal range in the peripheral direction and specifically, is a range of substantially 60 degrees with the rotary shaft 2 as the center.

As described above, in the present embodiment, in each of the curved parts 13 and 14, the number of the magnetic poles of each of the magnets 60 is two. Accordingly, as compared with, for example, the conventionally widely used oval-shaped 2-pole 3-slot motor or the like, a torque of the motor 1 can be made large. In addition to the magnetic poles 61 and 62 as well as 71 and 72 provided for the magnets 60, the magnetic poles 81 and 82 obtained when the flat plate parts 11 and 12 are magnetized can be utilized. Hence, a magnetic efficiency of the magnets 60 can be enhanced. Motor characteristics of the motor 1 per volume can be enhanced. Compared with the conventionally widely used oval-shaped 2-pole 3-slot motor or the like, the number of the magnetic poles and the number of the slots are large, a cogging torque of the motor 1 can be made small.

The way of arranging the respective magnetic poles 61 and 62 as well as 71 and 72, 81, and 82 has symmetry in the peripheral direction with the rotary shaft 2 as the center. Each of the magnetic poles 61 and 62 as well as 71 and 72, 81, and 82 is arranged so as to have each of the magnetic polarities in the range in the substantially same peripheral direction, viewed from the rotary shaft 2. Accordingly, balance in magnetic flux density distribution over the peripheral direction is fine, the cogging torque can be suppressed to be much smaller, and the armature part 1b can be smoothly efficiently rotated.

The motor 1 has the outer peripheral shape having the comparatively short length in the upper-lower direction. Accordingly, both of downsizing and increasing the torque of the motor 1 can be achieved.

In the motor 1, one of the magnets 60 is provided for each one of the curved parts 13 and 14. Accordingly, the number of the used magnets 60 is the same as the number of the conventional oval-shaped 2-pole 3-slot motor, and therefore, the motor 1 can be easily manufactured.

Hereinafter, variants of the present embodiment will be described. In the below description, the same components as the components in the motor 1 according to the present embodiment are denoted with the same reference numerals and letters, and the description for the same components may be omitted.

[Description of First Variant]

Note that a shape of each of first areas of a frame with no magnets arranged, that is, flat plate parts, may be made different from a shape of each of the flat plate parts in the above-described embodiment. For example, a projecting portion projecting toward an outer peripheral surface of an armature part may be provided on an inner peripheral surface of each of the first areas.

Figure 4:
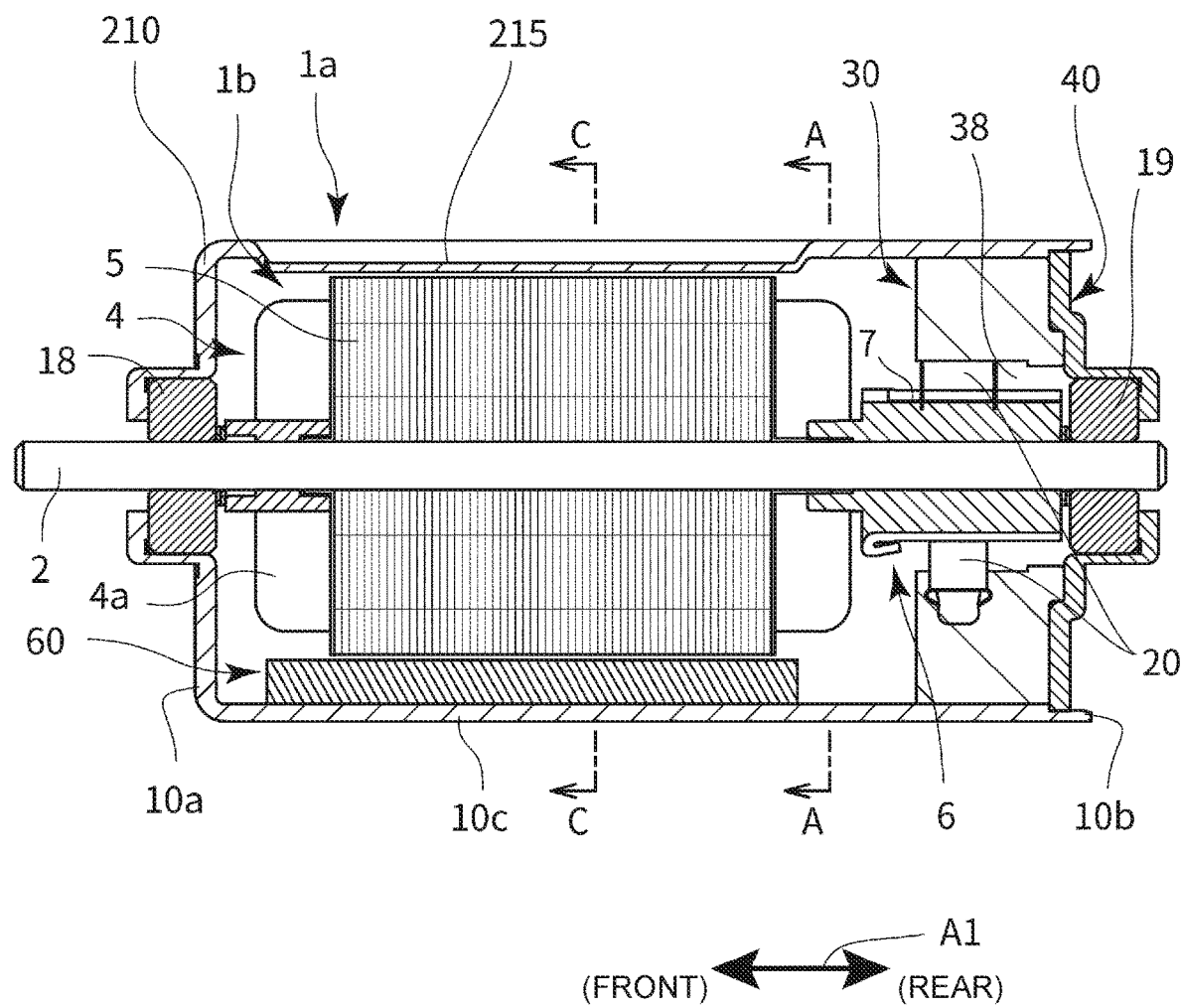
FIG. 4 is a cross-sectional view showing a motor according to a first variant of the present embodiment.
Figure 5:
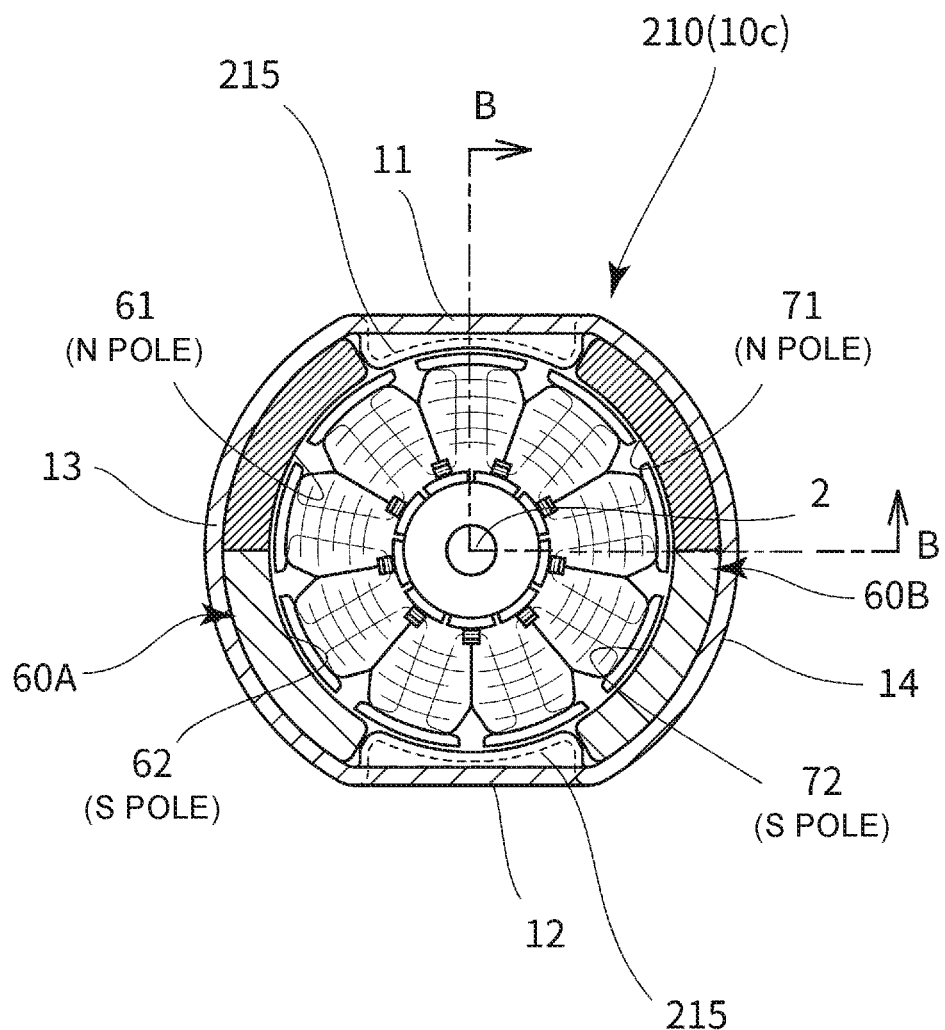
FIG. 5 is a cross-sectional view taken from a line A-A in FIG. 4.
Figure 5:
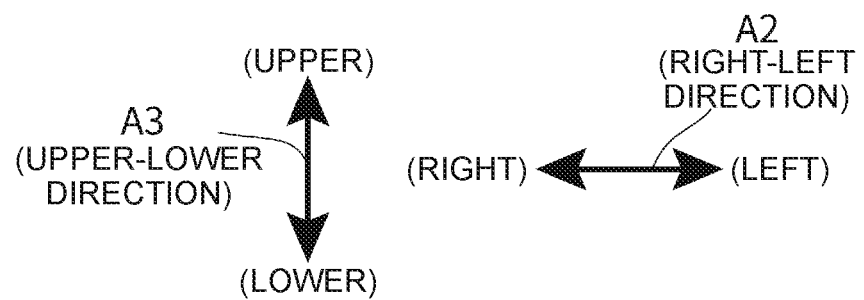
Figure 6:
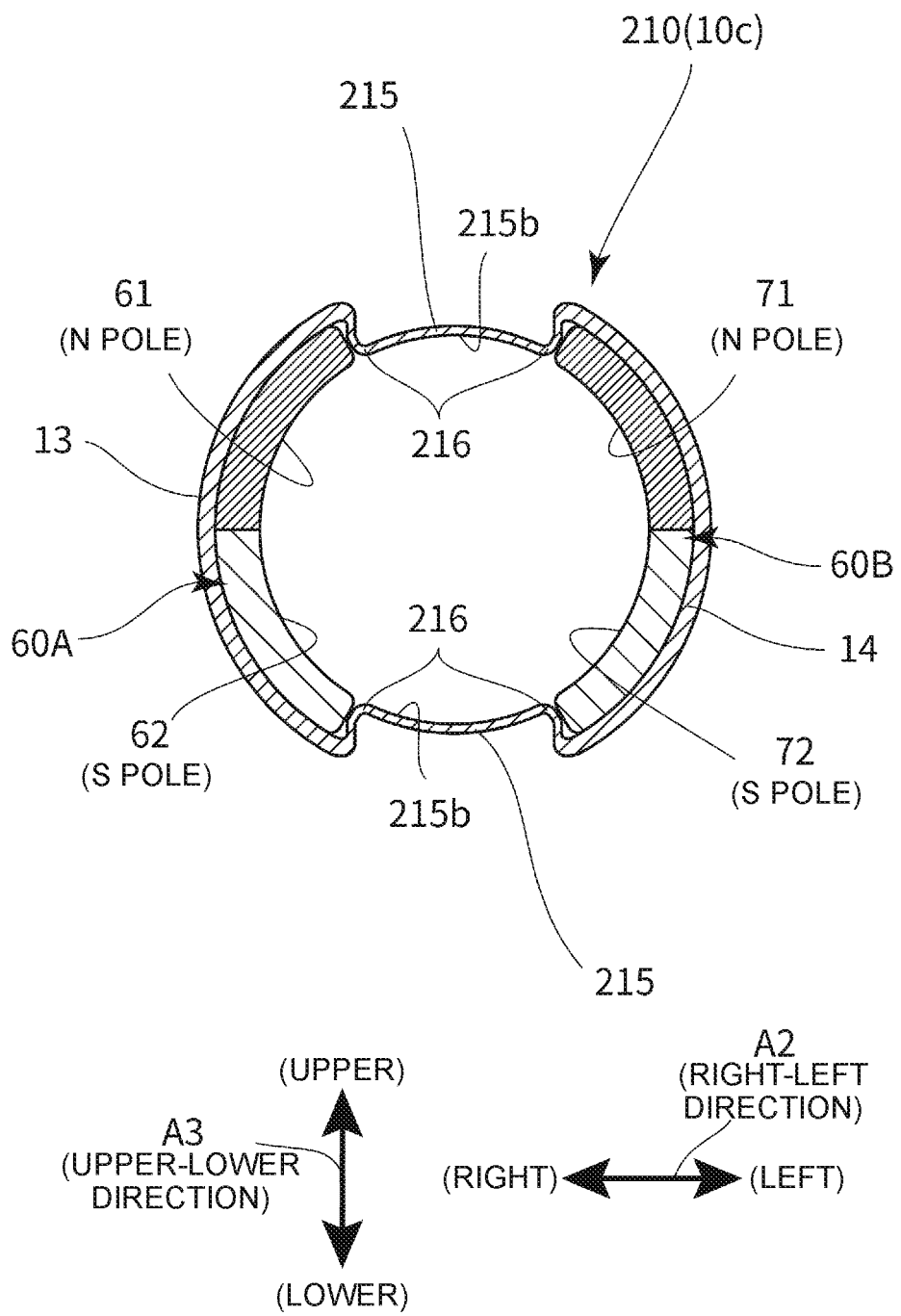
FIG. 6 is a cross-sectional view taken from a line C-C in FIG. 4.

FIG. 4 is a cross-sectional view showing a motor 201 according to a first variant of the present embodiment. FIG. 5 is a cross-sectional view taken from a line A-A in FIG. 4. FIG. 6 is a cross-sectional view taken from a line C-C in FIG. 4.

A cross-section shown in FIG. 4 is a cross-section taken from a line B-B in FIG. 5. FIG. 5 and FIG. 6 are shown in the same illustration manners as in FIG. 2 and FIG. 3, respectively.

The motor 201 according to the first variant has a frame 210 with a part of components being different from the components of the frame 10 of the motor 1 according to the above-described embodiment. The other components of the motor 201 are the same as the components of the motor 1.

As shown in FIG. 4, the frame 210 is provided with projecting portions 215. As shown in FIG. 5, each of the projecting portions 215 is formed on each of an upper side flat plate part 11 and a lower side flat plate part 12, respectively. Each of the projecting portions 215 is arranged in a position facing an armature core 5 in a radial direction.

Each of the projecting portions 215 is a part projecting toward an outer peripheral surface of an armature part 1b on an inner peripheral surface of each of the flat plate parts 11 and 12. In the present variant, on an outer peripheral surface of the motor 201, each of the projecting portions 215 has a shape formed by recessing one part of each of the flat plate parts 11 and 12 from an outside toward an inner side (toward a rotary shaft 2). The projecting portions 215 are formed by deforming the flat plate parts 11 and 12, for example, by subjecting the flat plate parts 11 and 12 to drawing processing. Note that a method of forming the projecting portions 215 is not limited to the above-mentioned method. In addition, each of the projecting portions 215 may be formed, for example, by connecting a magnetic body to an inner peripheral surface of each of the flat plate parts 11 and 12.

Each of the projecting portions 215 has a curved surface 215b having the substantially same curvature radius as a curvature radius of an inner peripheral surface of each of magnets 60 neighboring to each of the flat plate parts 11 and 12 in a peripheral direction. In other words, as shown in FIG. 6, in the present variant, each of the magnets 60 has an inner peripheral surface having a curvature radius slightly larger than a radius of the armature core 5, and each of the projecting portions 215 also has the curved surface 215b having the substantially same curvature radius as the above-mentioned curvature radius.

Peripheral direction both end portions 216 of each of the upper and lower projecting portions 215 are positioned in the vicinity of end portions of the neighboring magnets 60. In other words, a cylindrical surface covering the whole periphery of the armature core 5 with almost no interspace is configured by the inner peripheral surfaces of the two magnets 60 and the upper and lower curved surfaces 215b.

The motor 201 according to the first variant has advantages similar to the advantages of the motor 1 according to the above-described embodiment. In addition, since the motor 201 is provided with the projecting portions 215 on the parts having no magnets 60 in the peripheral direction as described above, magnetic flux passing through the flat plate parts 11 and 12 efficiently acts on the armature part 1b, and a magnetic efficiency can be thus enhanced. Since the peripheries of the projecting portions 215 are connected to the other parts of the frame 10, in magnetic circuitry configured with the magnets 60, leakage magnetic flux can be reduced, and the magnetic efficiency can be thus more enhanced. Balance of a magnetic flux density distribution in the peripheral direction can be further enhanced, and the motor 201 can be smoothly rotated.

[Description of Second Variant]

Projecting portions provided on inner peripheral surfaces of first areas may be arranged by cutting parts of a frame 10.

Figure 7:
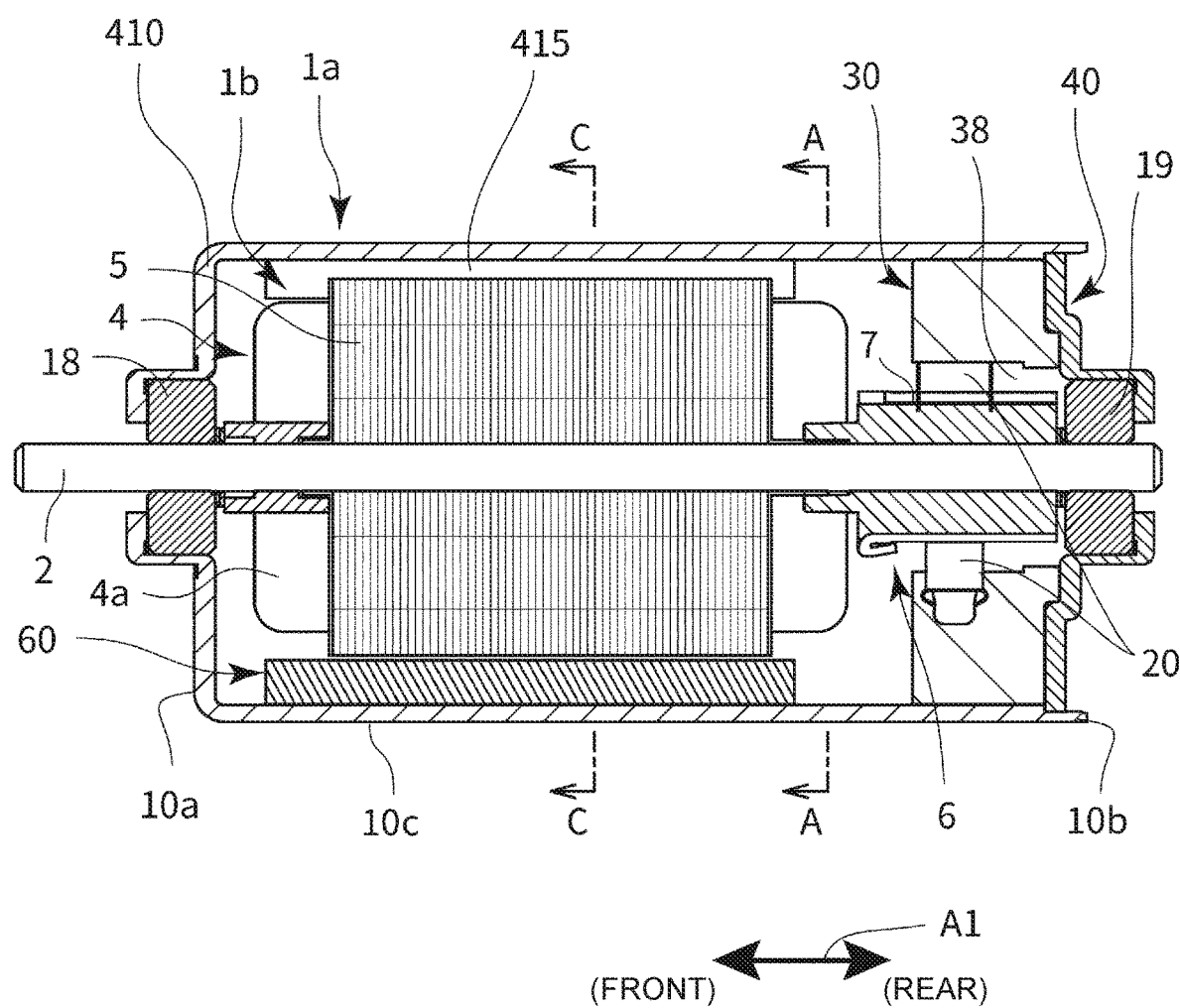
FIG. 7 is a cross-sectional view showing a motor according to a second variant of the present embodiment.
Figure 8:
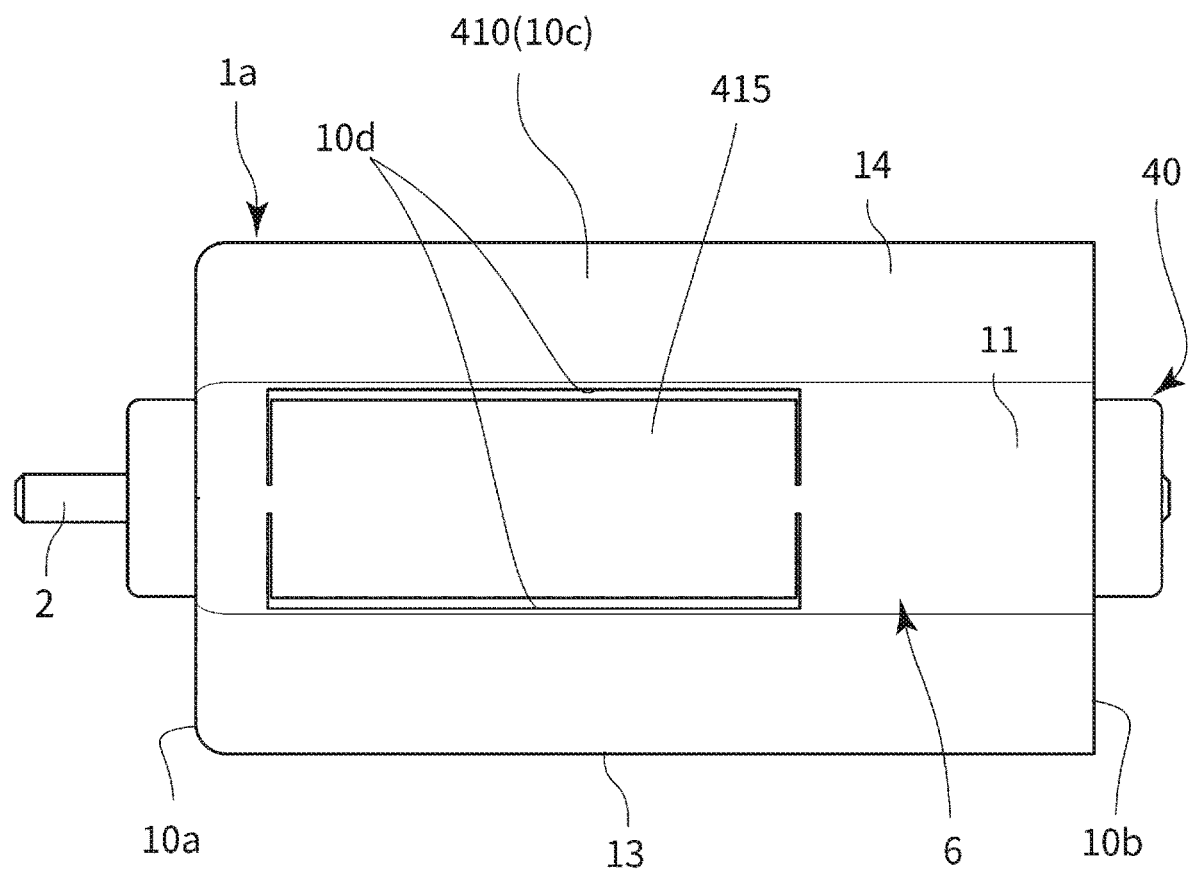
FIG. 8 is a plan view showing the motor according to the second variant of the present embodiment.
Figure 8:
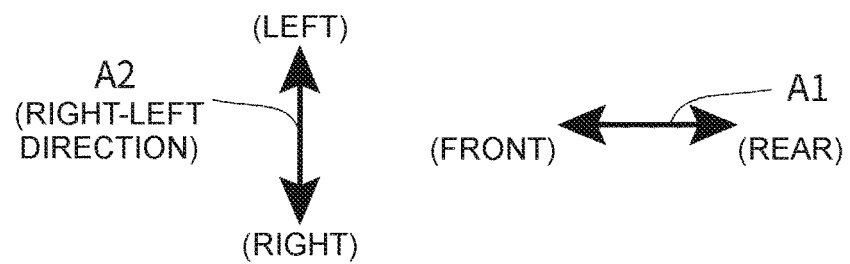
Figure 9:
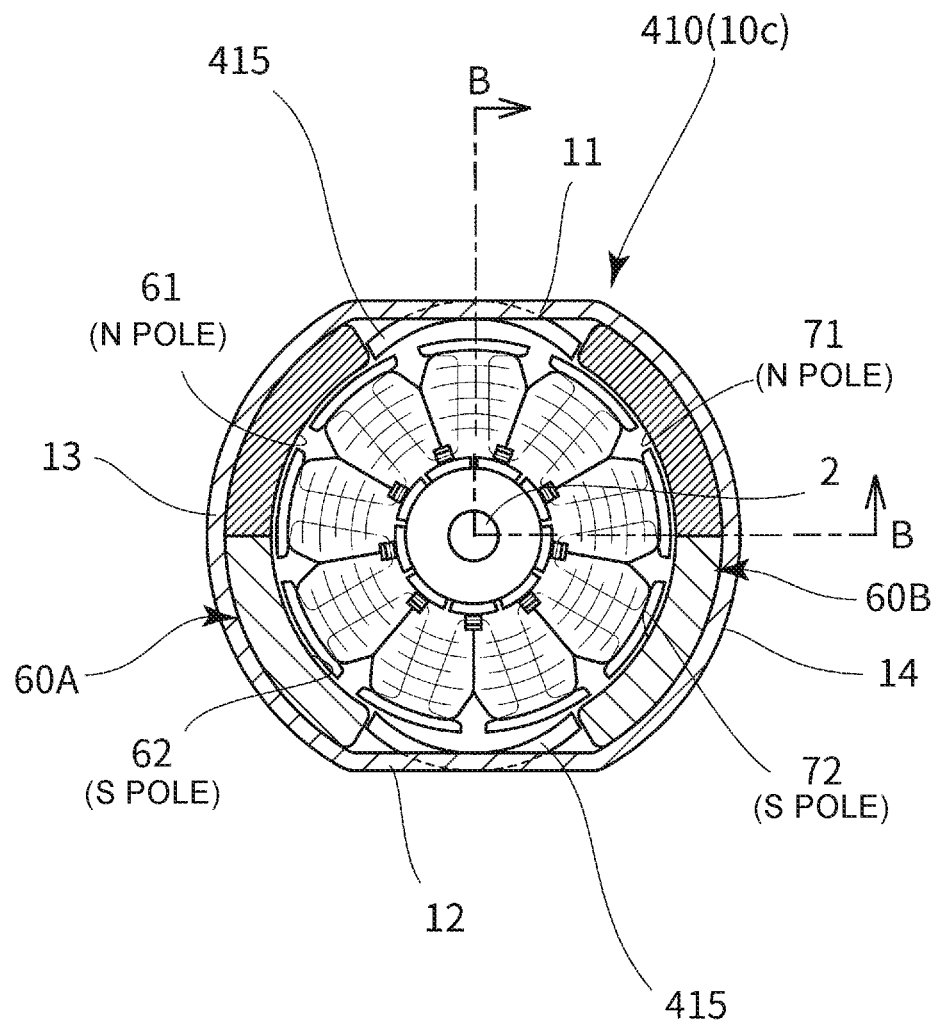
FIG. 9 is a cross-sectional view taken from a line A-A in FIG. 7.
Figure 9:
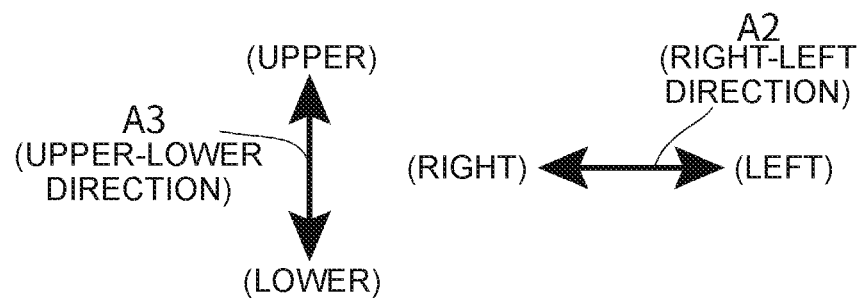
Figure 10:
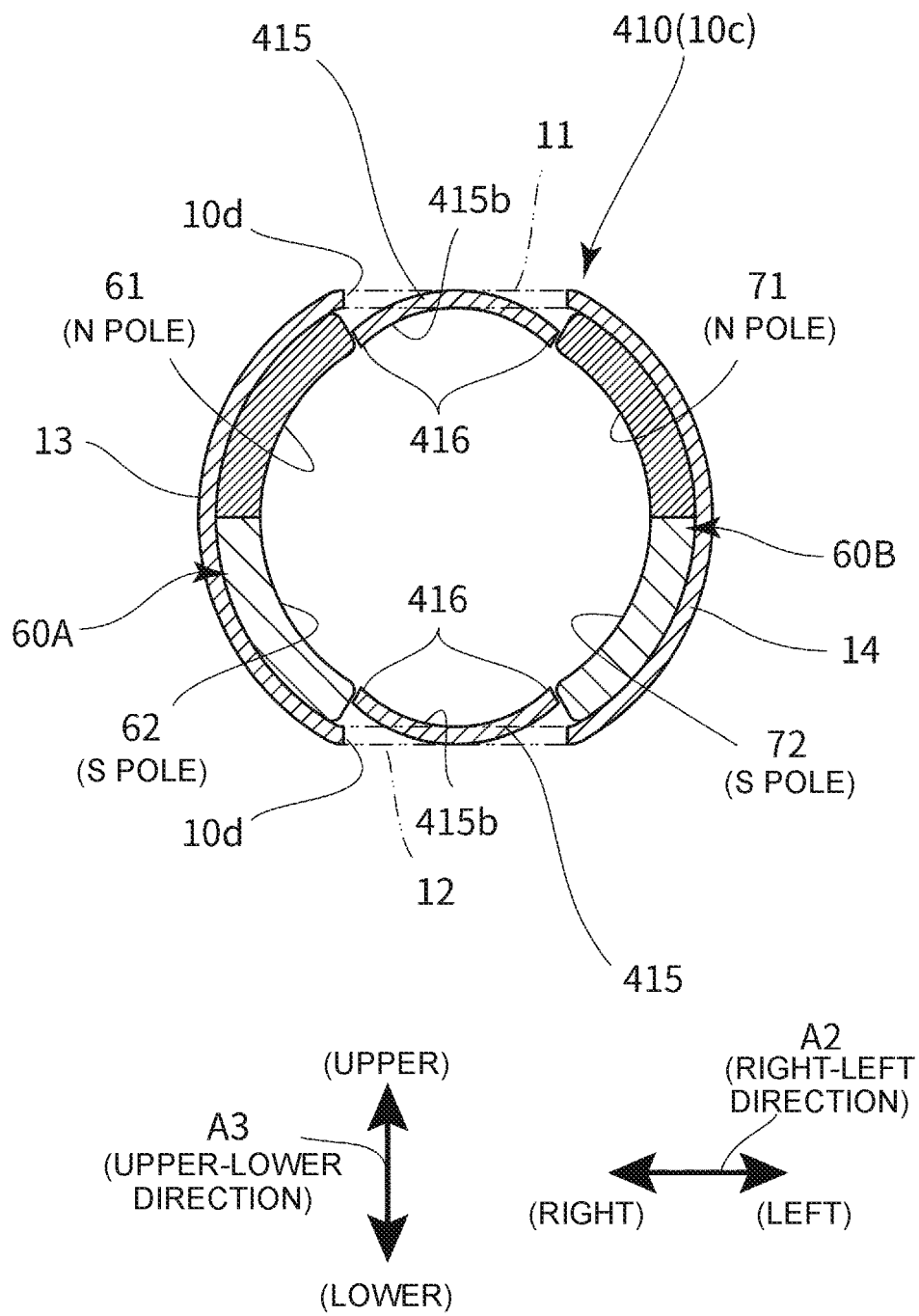
FIG. 10 is a cross-sectional view taken from a line C-C in FIG. 7.

FIG. 7 is a cross-sectional view showing a motor 401 according to a second variant of the present embodiment. FIG. 8 is a plan view showing the motor 401 according to the second variant. FIG. 9 is a cross-sectional view taken from a line A-A in FIG. 7. FIG. 10 is a cross-sectional view taken from a line C-C in FIG. 7.

A cross-section shown in FIG. 7 is a cross-section taken from a line B-B in FIG. 9. FIG. 9 and FIG. 10 are shown in the same illustration manners as in FIG. 2 and FIG. 3, respectively.

The motor 401 according to the second variant has a frame 410 with a part of components being different from the components of the frame 10 of the motor 1 according to the above-described embodiment. The other components of the motor 401 are the same as the components of the motor 1.

As shown in FIG. 7, the frame 410 is provided with deformed portions (one example of projecting portions) 415. As shown in FIG. 9, the deformed portions 415 are formed on an upper side flat plate part 11 and a lower side flat plate part 12, respectively. Each of the deformed portions 415 is formed in a position facing an armature core 5 in a front-rear direction.

Each of the deformed portions 415 is a part projecting toward an outer peripheral surface of an armature part 1b on an inner peripheral surface of each of flat plate parts 11 and 12. In the present variant, by making cuts 10d each being of a rectangular shape with no one side in portions of each of the flat plate parts 11 and 12 and bending areas cut off from a peripheral part, except said one side, toward inner sides, the deformed portions 415 are formed. The cuts 10d are arranged in two right and left positions of each of the flat plate parts 11 and 12. In other words, as shown in FIG. 8, each of the cuts 10d is configured by a side of a part in the vicinity of each of curved parts 13 and 14 in a front-rear direction and two sides extending from front-rear both end portions to the vicinity of a central portion of each of the flat plate parts 11 and 12 in a right-left direction. By bending inner side areas of the right and left cuts 10*d* and 10*d* toward inner sides, as shown in FIG. 10, the deformed portions 415 are formed. Note that in FIG. 10, states of the flat plate parts 11 and 12 before the deformation of the deformed portions 415 are indicated by two-dot chain lines.

Each of the deformed portions 415 has a curved surface 415*b* having a curvature radius approximating a curvature radius of an inner peripheral surface of each of the magnets 60 neighboring to the flat plate parts 11 and 12 in the peripheral direction. Peripheral direction both end portions 416 of each of the upper-lower deformed portions 415 are positioned in the vicinity of end portions of the neighboring magnets 60. In other words, a cylindrical surface covering the whole periphery of the armature core 5 with almost no interspace is configured by the inner peripheral surfaces of the two magnets 60 and the upper and lower curved surfaces 415*b*.

The motor 401 according to the second variant has advantages similar to the advantages of the motor 1 according to the above-described embodiment. In addition, since the motor 401 is provided with the deformed portions 415 on the parts having no magnets 60 in the peripheral direction as described above, magnetic flux passing through the flat plate parts 11 and 12 efficiently acts on the armature part 1*b*, and a magnetic efficiency can be thus enhanced.

[Description of Other Variants]

A number of magnetic poles provided for one curved part and a number of magnetic poles of the whole motor, including magnetic poles produced by magnetizing flat plate parts, are not limited to the numbers cited in the above-described embodiment. A motor shown in the below-described variant also has advantages similar to the advantages of the above-described embodiment.

Figure 11:
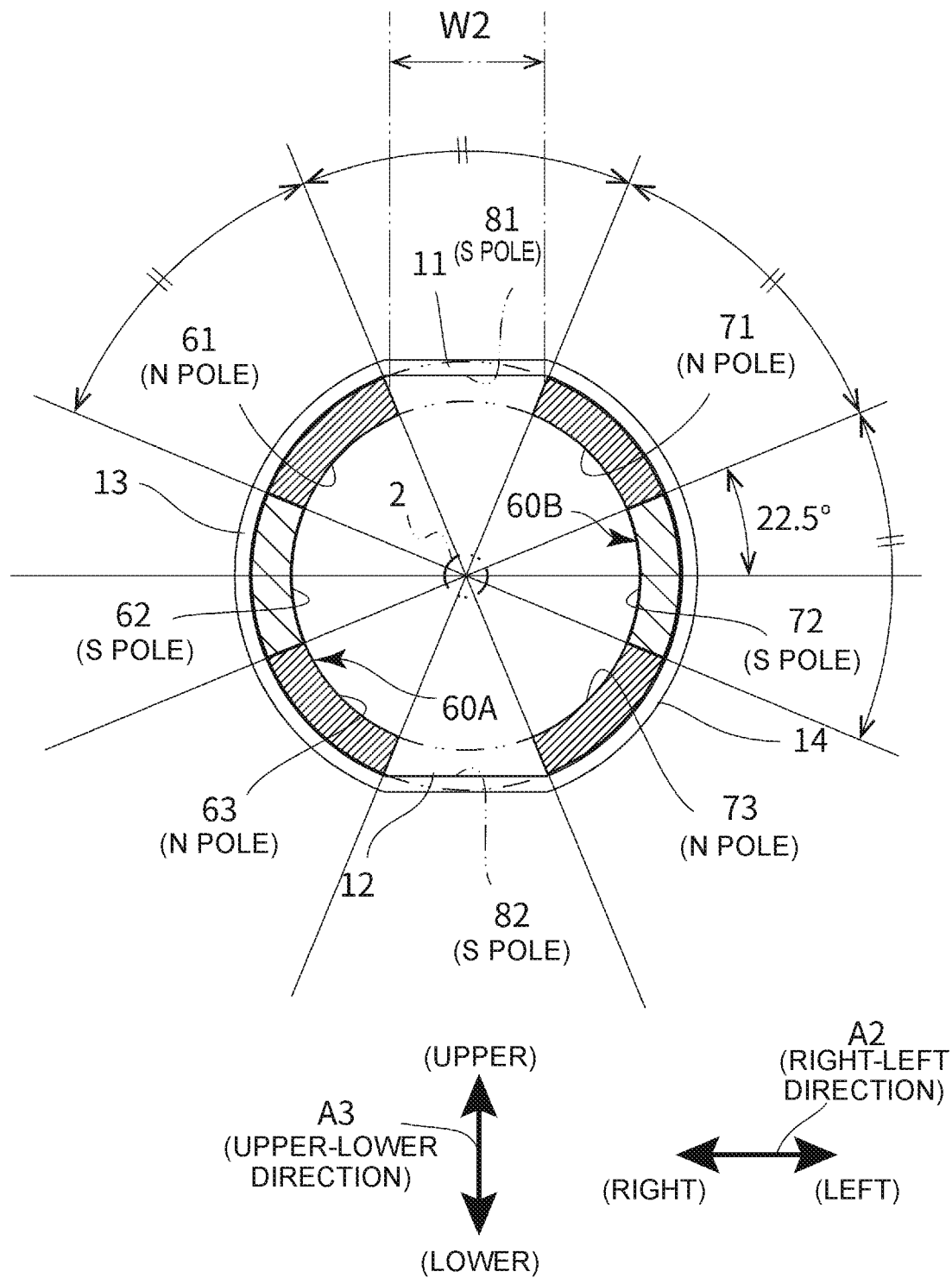
FIG. 11 is a diagram illustrating another variant of the present embodiment.

FIG. 11 is a diagram illustrating another variant of the present embodiment.

In FIG. 11, an example of a case of configuring, for example, an 8-pole motor is shown.

In the example shown in FIG. 11, a first magnet 60A attached on a right side curved part 13 is provided with three magnetic poles 61, 62, and 63 (from the top, an N pole 61, an S pole 62, and an N pole 63), and a second magnet 60B attached on a left side curved part 14 is provided with three magnetic poles 71, 72, and 73 (from the top, an N pole 71, an S pole 72, and an N pole 73). In other words, polarities of the magnetic pole 61 and the magnetic pole 71 neighboring on both sides of an upper side flat plate part 11 in a peripheral direction are the same as each other, and polarities of the magnetic pole 63 and the magnetic pole 73 neighboring on both sides of a lower side flat plate part 12 in the peripheral direction are the same as each other.

By arranging the magnetic pole 61 and magnetic pole 71 being the N poles on the both sides of the upper side flat plate part 11 in the peripheral direction, a lateral central portion of the upper side flat plate part 11 is magnetized and thus becomes a magnetic pole 81. The magnetic pole 81 is the S pole.

In addition, by arranging the magnetic pole 63 and the magnetic pole 73 being the N poles on the both sides of the lower side flat plate part 12 in the peripheral direction, a lateral central portion of the lower side flat plate part 12 is magnetized and thus becomes a magnetic pole 81. The magnetic pole 81 is the S pole.

Thus, a periphery of an armature part 1*b* is surrounded clockwise by the magnetic pole 71, the magnetic pole 72, the magnetic pole 73, the magnetic pole 82, the magnetic pole 63, the magnetic poll 62, the magnetic pole 61, and the magnetic pole 81. The polarities of the magnetic poles 61, 62, 63, 71, 72, 73, 81, and 82 are as described above, and the N pole and the S pole are alternately arranged in the peripheral direction, respectively. Accordingly, it can be said that with the magnetic poles 81 and 82 combined, the motor 1 is the 8-pole motor as a whole.

Note that as shown in FIG. 11, in the right side curved part 13, a range having the three magnetic polarities (the N pole, the S pole, and the N pole) imparted by the three magnetic poles 61, 62, and 63 is in a range of substantially 135 degrees with a rotary shaft 2 as a center. Also in the left side curved part 14, a range is similar to the above-mentioned range. In other words, in each of the upper side flat plate part 11 and lower side flat plate part 12 having no magnets 60, a range having the polarity is in a range of substantially 45 degrees with the rotary shaft 2 as the center. In the present embodiment, a length W2 of each of the upper side flat plate part 11 and the lower side flat plate part 12 in a right-left direction is substantially equal to a double of a value obtained by multiplying a radius of each of the curved parts 13 and 14 by sin 22.5°. A range having each of the magnetic polarities imparted by each of the magnetic poles 61, 62, 63, 71, 72, 73, 81, and 82 is a mutually substantially equal range in the peripheral direction and specifically, is a range of substantially 45 degrees with the rotary shaft 2 as the center.

Figure 12:
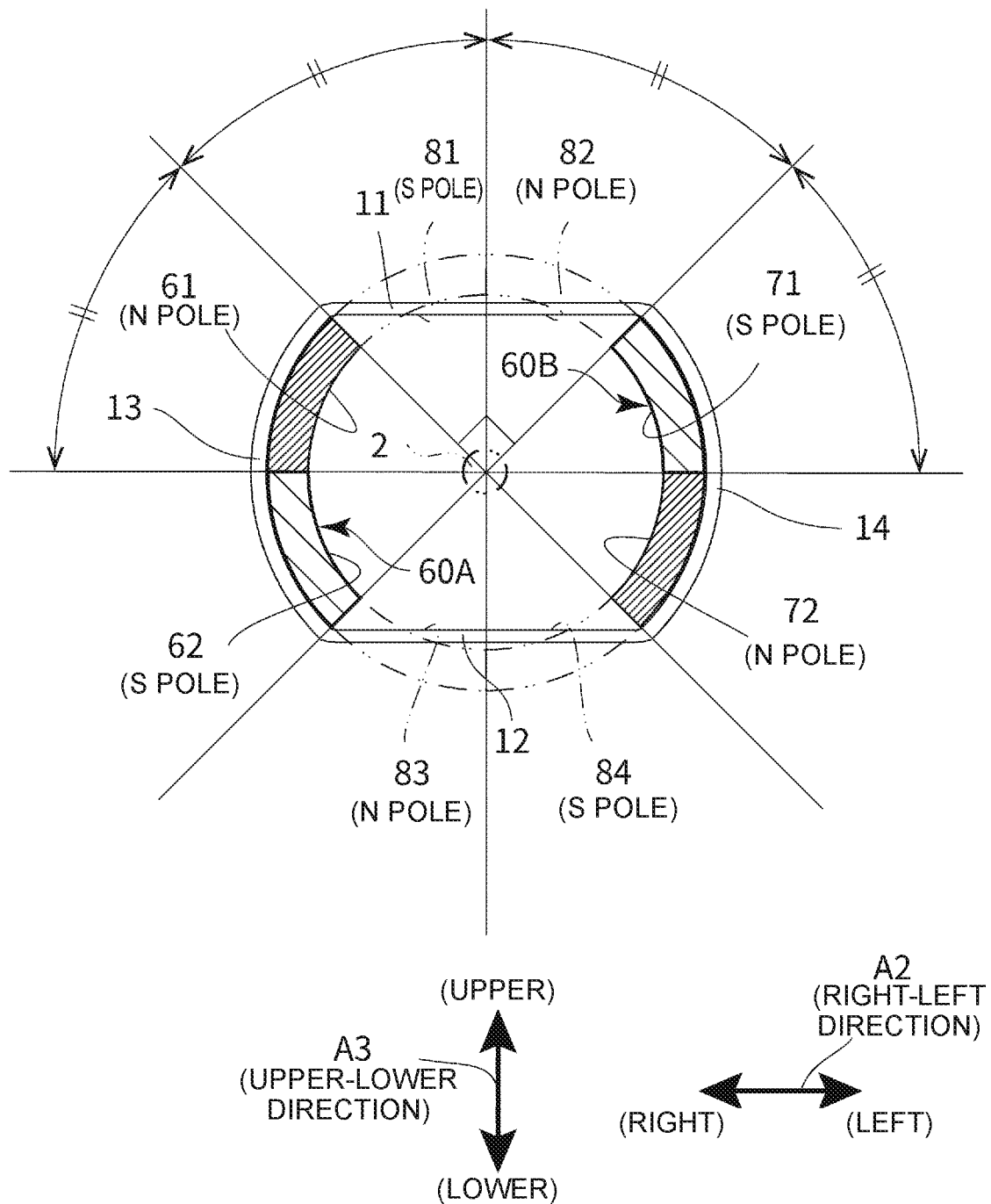
FIG. 12 is a diagram illustrating further another variant of the present embodiment.

FIG. 12 is a diagram illustrating further another variant of the present embodiment.

In FIG. 12, an example of a case of configuring, for example, an 8-pole motor is shown.

In the example shown in FIG. 12, a first magnet 60A attached on a right side curved part 13 is provided with two magnetic poles 61 and 62 (from the top, an N pole 61 and an S pole 62), and a second magnet 60B attached on a left side curved part 14 is provided with two magnetic poles 71 and 72 (from the top, an S pole 71 and an N pole 72). In other words, polarities of the magnetic pole 61 and the magnetic pole 71 neighboring on both sides of an upper side flat plate part 11 in a peripheral direction are different from each other, and polarities of the magnetic pole 63 and the magnetic pole 73 neighboring on both sides of a lower side flat plate part 12 in the peripheral direction are different from each other.

A right side portion of the upper side flat plate part 11 neighboring the magnetic pole 61 being the N pole is magnetized and becomes a magnetic pole 81 being the S pole, and a left side portion of the upper side flat plate part 11 neighboring the magnetic pole 71 being the S pole is magnetized and becomes a magnetic pole 82 being the N pole.

In addition, a right side portion of the lower side flat plate part 12 neighboring the magnetic pole 62 being the S pole is magnetized and becomes a magnetic pole 83 being the N pole, a left side portion of the lower side flat plate part 12 neighboring the magnetic pole 72 being the N pole is magnetized and becomes a magnetic pole 84 being the S pole.

Thus, a periphery of an armature part 1*b* is surrounded clockwise by the magnetic pole 71, the magnetic pole 72, the magnetic pole 84, the magnetic pole 83, the magnetic pole 62, the magnetic poles 61, the magnetic pole 81, and the magnetic pole 82. The polarities of the magnetic poles 61, 62, 71, 72, 81, 82, 83, and 84 are as described above, and the N pole and the S pole are alternately arranged in the peripheral direction, respectively. Accordingly, it can be said that with the magnetic poles 81, 82, 83, and 84 combined, the motor 1 is the 8-pole motor as a whole.

Note that as shown in FIG. 12, in the right side curved part 13, a range having the two magnetic polarities (the N pole and the S pole) imparted by the two magnetic poles 61 and 62 is in a range of substantially 90 degrees with a rotary shaft 2 as a center. Also in the left side curved part 14, a range is similar to the above-mentioned range. In other words, in each of the upper side flat plate part 11 and lower side flat plate part 12 having no magnets 60, a range having the polarity is in a range of substantially 90 degrees with the rotary shaft 2 as the center. A range having each of the magnetic polarities imparted by each of the magnetic poles 61, 62, 71, 72, 81, 82, 83, and 84 is a mutually substantially equal range in the peripheral direction and specifically, is a range of substantially 45 degrees with the rotary shaft 2 as the center.

[Others]

By combining feature points of the above-described embodiment and variants, a motor may be configured. The above-described embodiment and variants may be configured without some of the components or some of the component may be configured in other modes.

The shape of the motor is not limited to the oval shape having the two flat plate parts and the two curved parts as described above. For example, the shape may be a square shape. The frame may be a frame having an inner peripheral shape being different from the outer peripheral shape.

The frame of the motor is not limited to the frame having the curved parts and the flat plate parts. The flat plate parts may be slightly curved. In addition, the magnet provided for one curved part (second area) is not limited to the one-piece magnet and may be a magnet being divided into a plurality of pieces. In other words, it is only required for the frame to have the plurality of first areas with no magnets provided and the plurality of second areas, with each of the first areas and each of the second areas alternately arranged in a peripheral direction. It is only required that in an inner side of each of the second areas, at least one or more of a plurality of magnets is or are provided and a plurality of magnetic poles arranged in the peripheral direction are provided.

In the above-described embodiment, the magnetic gap formed by the inner surface of the tubular portion of each of the first areas and the armature part may be provided between each of the inner surfaces of the tubular portion mutually and directly facing each other and the armature part. In addition, for example, magnetic bodies formed of iron or the like, other than the magnetized magnetic bodies such as the magnets, may be provided on the inner surface of the tubular portion, and the magnetic gap may be formed by these magnetic bodies and the armature part.

The above-described embodiment is to be considered in all respects merely as being illustrative and as not being restrictive. It is intended that the scope of the present disclosure is, therefore, indicated by the appended claims rather than by the foregoing description of the embodiment and that all modifications and variations as fall within the meaning and purview and range of equivalency of the appended claims are embraced within their scope.

What is claimed is:

1. A motor comprising:
a rotary shaft;
an armature part;
a frame including a tubular portion surrounding the armature part; and
two magnets, each magnet including opposite magnetic poles, wherein
the tubular portion is formed with a magnetic body,
the tubular portion includes two flat plate parts and two curved parts,
the two curved parts connect with the two plate parts,
each magnet neighbors both sides of each flat plate part in a peripheral direction,
each magnet is disposed inside each curve part in a radial direction,
a magnetic gap is provided in a radial direction, the magnetic gap being formed by an inner surface of the flat plate parts and the armature part,
no magnet is provided at each flat plate part,
each flat plate part is magnetized to have a magnetic polarity by magnet poles of the two magnets, the magnet poles of the two magnets having the same magnetic polarity, and
the magnetic polarity of each flat plate part is opposite to the same magnetic polarity of the magnet poles of the two magnets.

2. The motor according to claim 1, wherein
in each curved part, a range of each magnet is in a range of substantially 120 degrees with the rotary shaft as a center.

3. A motor comprising:
a rotary shaft;
an armature part;
a frame including a tubular portion surrounding the armature part; and
two magnets, each magnet including opposite magnetic poles, wherein
the tubular portion is formed with a magnetic body,
the tubular portion includes two flat plate parts and two curved parts,
the two curved parts connect with the two plate parts,
each magnet neighbors both sides of each flat plate part in a peripheral direction,
each magnet is disposed inside each curve part in a radial direction,
a magnetic gap is provided in a radial direction, the magnetic gap being formed by an inner surface of the flat plate parts and the armature part,
no magnet is provided at each the flat plate parts,
each flat plate part is magnetized to have two magnetic polarities by magnet poles of the two magnets, the magnet poles of the two magnets having opposite magnetic polarities, and
the two magnetic polarities of each flat plate part are opposite.

4. The motor according to claim 1, wherein
in each curved part, a range having the two magnets is in a range of substantially 120 degrees with the rotary shaft as a center.

* * * * *